United States Patent
Kim et al.

(10) Patent No.: US 12,504,329 B2
(45) Date of Patent: Dec. 23, 2025

(54) LONG-WAVE INFRARED SENSOR AND ELECTRONIC DEVICE INCLUDING THE SAME

(71) Applicant: SAMSUNG ELECTRONICS CO., LTD., Suwon-si (KR)

(72) Inventors: Jinmyoung Kim, Suwon-si (KR); Choongho Rhee, Suwon-si (KR); Byonggwon Song, Suwon-si (KR); Yongseop Yoon, Suwon-si (KR); Jaekwan Kim, Suwon-si (KR); Jangwoo You, Suwon-si (KR); Byungkyu Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 183 days.

(21) Appl. No.: 18/215,477

(22) Filed: Jun. 28, 2023

(65) Prior Publication Data
US 2024/0142311 A1  May 2, 2024

(51) Int. Cl.
*G01J 5/22* (2006.01)
*G01J 5/20* (2006.01)

(52) U.S. Cl.
CPC ........... *G01J 5/22* (2013.01); *G01J 2005/202* (2013.01)

(58) Field of Classification Search
CPC .......... G01J 5/22; G01J 2005/202; G01J 5/20; G01J 5/024; H10B 61/00; H10N 50/10
See application file for complete search history.

(56) References Cited

U.S. PATENT DOCUMENTS 5,311,019 A * 5/1994 Gammarino .............. G01J 5/10
250/338.3
7,494,232 B2 * 2/2009 Wu ........................ G02B 5/208
359/359

(Continued)

FOREIGN PATENT DOCUMENTS

CN  114256410 A  3/2022
WO  2021/021690 A1  2/2021

OTHER PUBLICATIONS

Ikuo Fujiwara et al., "Scale down of p-n junction diodes of an uncooled IR-FPA for improvement of the sensitivity and thermal time response by 0.13-μm CMOS technology", Proc. of SPIE, 2011, vol. 8012 (10 pages total).

(Continued)

*Primary Examiner* — David P Porta
*Assistant Examiner* — Gisselle M Gutierrez
(74) *Attorney, Agent, or Firm* — Sughrue Mion, PLLC

(57) ABSTRACT

Provided are a long-wave infrared sensor and an electronic device including the same. The long-wave infrared sensor and the electronic device including the same include a pixel array including a plurality of pixels, an optical absorber layer arranged on the pixel array, and a drive circuit configured to drive the pixel array, wherein each of the plurality of pixels for a long-wave infrared sensor includes a lower electrode and an upper electrode which are arranged apart from each other, and a plurality of magnetic tunnel junction devices arranged regularly between the lower electrode and the upper electrode and electrically connected to each other in parallel, and the plurality of magnetic tunnel junction devices are arranged apart from each other with an empty space therebetween.

21 Claims, 18 Drawing Sheets

(56) References Cited

U.S. PATENT DOCUMENTS

| | | | | |
|---|---|---|---|---|
| 8,471,204 B2* | 6/2013 | Bornfreund | | H10K 39/32 |
| | | | | 250/339.05 |
| 8,841,617 B2* | 9/2014 | Cole | | G01J 5/20 |
| | | | | 250/339.14 |
| 9,128,230 B1* | 9/2015 | Mohamed | | G01J 5/046 |
| 9,885,697 B2 | 2/2018 | Roizin et al. | | |
| 10,121,922 B2* | 11/2018 | Wei | | H10F 77/206 |
| 10,288,494 B2 | 5/2019 | Lu et al. | | |
| 10,483,416 B2* | 11/2019 | Rana | | G01J 5/20 |
| 10,948,571 B1* | 3/2021 | Brown | | G01S 7/4816 |
| 11,248,953 B2* | 2/2022 | Chow | | G01J 1/08 |
| 2006/0132905 A1* | 6/2006 | Wu | | G02B 5/00 |
| | | | | 359/359 |
| 2009/0321639 A1* | 12/2009 | Yoon | | G01J 5/0831 |
| | | | | 250/338.1 |
| 2010/0213558 A1* | 8/2010 | Bae | | H01F 10/3254 |
| | | | | 257/E29.323 |
| 2012/0012954 A1* | 1/2012 | Yamada | | H10N 50/01 |
| | | | | 257/E29.323 |
| 2012/0049313 A1 | 3/2012 | Kwon et al. | | |
| 2012/0075922 A1* | 3/2012 | Yamada | | H10B 61/22 |
| | | | | 365/158 |
| 2012/0230089 A1* | 9/2012 | Yamada | | H10N 50/85 |
| | | | | 365/158 |
| 2015/0069555 A1* | 3/2015 | Sakai | | G11C 13/0033 |
| | | | | 257/421 |
| 2015/0236251 A1* | 8/2015 | Noh | | H10B 61/00 |
| | | | | 438/3 |
| 2016/0093669 A1* | 3/2016 | Lee | | H10B 61/00 |
| | | | | 257/421 |
| 2016/0104745 A1* | 4/2016 | Park | | H10B 61/22 |
| | | | | 257/421 |
| 2021/0010127 A1* | 1/2021 | Kim | | H01J 37/32715 |
| 2023/0213390 A1* | 7/2023 | Kim | | G01J 5/10 |
| | | | | 324/451 |
| 2023/0343804 A1* | 10/2023 | Wang | | G01J 5/10 |
| 2024/0284802 A1* | 8/2024 | Shin | | H10N 50/80 |

OTHER PUBLICATIONS

D. Fujisawa et al., "Implementation of SOI diode uncooled IRFPA in TEC-less and shutter-less operation", Proc. of SPIE, 2018, vol. 10624, No. 1062421 (9 pages total).

* cited by examiner

[Security]

LONG-WAVE INFRARED SENSOR AND ELECTRONIC DEVICE INCLUDING THE SAME

CROSS-REFERENCE TO RELATED APPLICATION

This application is based on and claims priority under 35 U.S.C. § 119 to Korean Patent Application No. 10-2022-0129038, filed on Oct. 7, 2022, in the Korean Intellectual Property Office, the disclosure of which is incorporated by reference herein in its entirety.

BACKGROUND

1. Field

The disclosure relates to a long-wave infrared sensor and an electronic device including the same.

2. Description of Related Art

Long-wave infrared (LWIR) sensors are divided into quantum type LWIR sensors and thermal type LWIR sensors. Quantum type LWIR sensors use the photoconductive effect of semiconductor materials. Moreover, since the quantum type LWIR sensors have excellent quantum efficiency and operate at very low temperatures, thermal noise may be small, which leads to outstanding detectivity and noise equivalent temperature difference (NETD) characteristics. However, as a region reacting to infrared light is limited according to an energy gap and an operating temperature is near the liquid nitrogen temperature (77 K), the quantum type LWIR sensors are required to maintain a vacuum. Moreover, the quantum type LWIR sensors are highly expensive, and thus are mainly used for military use rather than civil use.

Thermal type LWIR sensors are further divided according to the driving principles and materials into various types of sensors, such as bolometer sensors, pyroelectrics sensors, ferroelectrics sensors, thermopile sensors, and Bimetal sensors. For example, the bolometer sensors are based on the principle that the resistance of materials changes according to the temperature, the pyroelectrics and the ferroelectrics sensors use the polarization change of materials according to the temperature, the thermopile sensors utilize the change in the electromotive force according to the temperature, and the bimetal sensors operate based on changes in the length according to the temperature.

SUMMARY

Provided is a pixel for a long-wave infrared sensor including a plurality of magnetic tunnel junction devices arranged apart from each other with an empty space between the plurality of magnetic tunnel junction devices.

Further, provided is a long-wave infrared sensor including a plurality of magnetic tunnel junction devices arranged apart from each other with an empty space between plurality of magnetic tunnel junction devices.

Further still, provided is an electronic device including a long-wave infrared sensor including a plurality of magnetic tunnel junction devices arranged apart from each other with an empty space between the plurality of magnetic tunnel junction devices.

Additional aspects will be set forth in part in the description which follows and, in part, will be apparent from the description, or may be learned by practice of the presented embodiments of the disclosure.

According to an aspect of the disclosure, there is provided a pixel for a long-wave infrared sensor, the pixel including: a lower electrode; an upper electrode spaced apart from the lower electrode; and a plurality of magnetic tunnel junction devices provided between the lower electrode and the upper electrode, and electrically connected to each other in parallel, wherein a resistance of each of the plurality of magnetic tunnel junction devices changes according to temperature, and wherein the plurality of magnetic tunnel junction devices are spaced apart from each other with an empty space between adjacent magnetic tunnel junction devices of the plurality of magnetic tunnel junction devices.

Each of the plurality of magnetic tunnel junction devices may include: a first magnetic layer provided on an upper surface of the lower electrode; a second magnetic layer provided on a lower surface of the upper electrode; and an insulating layer provided between the first magnetic layer and the second magnetic layer.

The pixel may include a protective layer around a lateral surface of each of the plurality of magnetic tunnel junction devices.

The protective layer may include at least one of a silicon oxide, an aluminum oxide, a hafnium oxide, and a silicon nitride.

A thickness of the protective layer may be greater than about 0 nm and less than or equal to about 100 nm.

The second magnetic layer may have a variable magnetization direction, and wherein the first magnetic layer may have a fixed magnetization direction.

The upper electrode and the lower electrode may include at least one of a titanium nitride film (TiN), platinum (Pt), palladium (Pd), tungsten (W), titanium (Ti), aluminum (Al), nickel (Ni), a nickel-chrome (NiCr) alloy, copper (Cu), and gold (Au).

The plurality of magnetic tunnel junction devices may be arranged in a matrix of M×N, and each of M and N is a natural number greater than or equal to 1.

According to another aspect of the disclosure, there is provided a long-wave infrared sensor including: a pixel array comprising a plurality of pixels arranged in a two-dimensional (2D) manner; an optical absorber layer provided on the pixel array and configured to absorb external light to generate heat; and a drive circuit configured to drive the pixel array, wherein each of the plurality of pixels may include: a lower electrode; an upper electrode spaced apart from the lower electrode; and a plurality of magnetic tunnel junction devices provided between the lower electrode and the upper electrode, wherein the plurality of magnetic tunnel junction devices are electrically connected to each other in parallel, wherein a resistance of each of the plurality of magnetic tunnel junction devices changes according to temperature, and wherein the plurality of magnetic tunnel junction devices are spaced apart from each other with an empty space between adjacent magnetic tunnel junction devices of the plurality of magnetic tunnel junction devices.

The plurality of pixels may be electrically connected to each other in series.

The long-wave infrared sensor may include a substrate having a through hole formed therein, wherein the plurality of pixels are arranged on the substrate.

The optical absorber layer may include at least one of a silicon nitride layer and a titanium nitride layer.

The optical absorber layer may be configured to absorb long-wave infrared light to generate heat.

Each of the plurality of magnetic tunnel junction devices may include: a first magnetic layer provided on an upper surface of the lower electrode; a second magnetic layer provided on a lower surface of the upper electrode; and an insulating layer provided between the first magnetic layer and the second magnetic layer.

The long-wave infrared sensor may include a protective layer around a lateral surface of each of the plurality of magnetic tunnel junction devices.

The protective layer may include at least one of a silicon oxide, an aluminum oxide, a hafnium oxide, and a silicon nitride.

A thickness of the protective layer may be greater than about 0 nm and less than or equal to about 100 nm.

The second magnetic layer may have a variable magnetization direction, and wherein the first magnetic layer may have a fixed magnetization direction.

The plurality of magnetic tunnel junction devices may be arranged in a matrix of M×N, and each of M and N is a natural number greater than or equal to 1.

According to another aspect of the disclosure, there is provided an electronic device including: a long-wave infrared sensor; and a processor configured to receive and process sensing signals output from the long-wave infrared sensor, wherein the long-wave infrared sensor may include: a pixel array comprising a plurality of pixels arranged in a two-dimensional (2D) manner; an optical absorber layer provided on the pixel array and configured to absorb external light to generate heat; and a drive circuit configured to drive the pixel array, wherein each of the plurality of pixels may include: a lower electrode; an upper electrode spaced apart from the lower electrode; and a plurality of magnetic tunnel junction devices provided between the lower electrode and the upper electrode, and electrically connected to each other in parallel, wherein a resistance of each of the plurality of magnetic tunnel junction devices changes according to temperature, and wherein the plurality of magnetic tunnel junction devices are spaced apart from each other with an empty space between adjacent magnetic tunnel junction devices of the plurality of magnetic tunnel junction devices.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
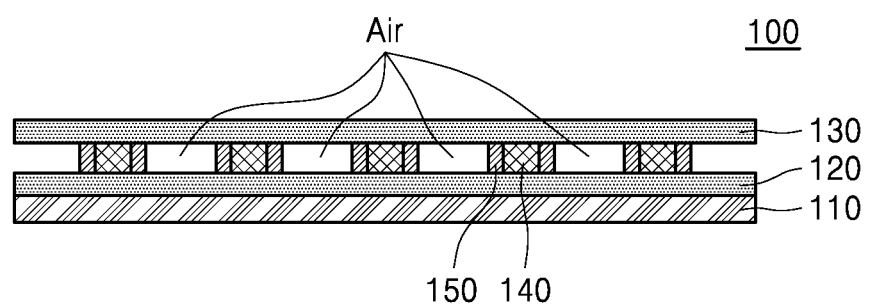
FIG. 1 is a cross-sectional view of a pixel for a long-wave infrared sensor according to an example embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Hereinafter, example embodiments will be described in detail with reference to the accompanying drawings. In the drawings, like reference numerals in the drawings denote like elements, and sizes of components in the drawings may be exaggerated for clarity and convenience of explanation. Meanwhile, embodiments described below are provided only as an example, and thus can be embodied in various forms.

It will be understood that when a component is referred to as being "on" or "over" another component, the component can be directly on, under, on the left of, or on the right of the other component, or can be on, under, on the left of, or on the right of the other component in a non-contact manner. An expression used in the singular encompasses the expression of the plural, unless it has a clearly different meaning in the context. When a portion "includes" an element, another element may be further included, rather than excluding the existence of the other element, unless otherwise described.

The use of the terms "a" and "an" and "the" and similar referents in the context of describing embodiments (especially in the context of the following claims) are to be construed to cover both the singular and the plural. The operations of all methods described herein can be performed in any suitable order unless otherwise indicated herein or otherwise clearly contradicted by context, and embodiments are not limited to the described order of the operations.

Moreover, the terms "part," "module," etc. refer to a unit processing at least one function or operation, and may be implemented by a hardware, a software, or a combination thereof.

The connecting lines, or connectors shown in the various figures presented are intended to represent exemplary functional relationships and/or physical or logical couplings between the various elements, and thus it should be noted that many alternative or additional functional relationships, physical connections or logical connections may be present in a practical device.

The use of any and all examples, or exemplary language provided herein, is intended merely to better illuminate technical ideas and does not pose a limitation on the scope of embodiments unless otherwise claimed.

In an example embodiment, a long-wave infrared sensor may refer to a sensor in which a plurality of thermal infrared devices are arranged in a two-dimensional (2D) manner. The long-wave infrared sensor may convert an output signal from the plurality of thermal infrared devices into a thermal image to display the temperatures difference of a measured object or the whole scene.

In an example embodiment, a thermal infrared device may be a bolometric resistance device. However, the disclosure is not limited thereto, and as such, according various other example embodiment, the thermal infrared device may be applied to a thermopiles device, a pyroelectric device, etc.

The long-wave infrared sensor according to an example embodiment may be an uncooled type long-wave infrared sensor. The long-wave infrared sensors have been developed by using two widely used sensing materials of VOx and α-Si but recently, a magnetic tunnel junction device is applied to the long-wave infrared sensors.

The sensor sensitivity of the uncooled type long-wave infrared sensor may be represented by the following formula:

$$\Re(V/W) = \frac{\Delta V}{P_{in}} = \frac{I_b \cdot R \cdot (\alpha \cdot \Delta T)}{P_{in}}$$

($P_{in}$=input power, $I_b$=Readout current, $G_{th}$=Pixel thermal conductivity, α=TCR, ΔT=temperature change, η=heat absorption rate).

According to the above formula, when a resistance value of the uncooled type long-wave infrared sensor is identical to a readout current, the higher a temperature coefficient of resistance (TCR) according to a specific temperature of a material is, the higher the sensor sensitivity may be for the same current power value.

A magnetic tunnel junction device may be miniaturized, and accordingly, may be easily manufactured in a form of pixel array. Accordingly, the magnetic tunnel junction device may be manufactured in a form of an image sensor including plurality of pixels. However, the magnetic tunnel junction device has a TCR value less than the existing sensing materials. In this regard, the formula among the temperature change, which is one of the parameters of the sensitivity of the sensor, the thermal capacity, and the thermal conductivity of a sensing portion may be represented as follows:

$$\Delta T = \frac{P_{in} \cdot \eta}{\sqrt{G_{th}^2 + \omega^2 \cdot C_{th}^2}}$$

($C_{th}$: thermal capacity, $G_{th}$: thermal conductivity).

According to the formula above, under the same input power, the lower the thermal conductivity or the thermal capacity is, the higher the temperature change amount of the sensing portion may be. When the temperature change amount increases, the sensitivity of the sensor may also increase. To lower the thermal capacity, a substantial part of a protective layer surrounding a lateral surface of the magnetic tunnel junction device may be removed. Detailed description thereof will be provided below.

FIG. 1 is a cross-sectional view of a pixel 100 for a long-wave infrared sensor according to an example embodiment.

Referring to FIG. 1, the pixel 100 for a long-wave infrared sensor may include a substrate 110, a lower electrode 120, an upper electrode 130, and a plurality of magnetic tunnel junction devices. According to an example embodiment, the lower electrode 120 and the upper electrode 130 may be arranged apart from each other. That is, an space or another element may be provided between the lower electrode 120 and the upper electrode 130. According to an example embedment, the plurality of magnetic tunnel junction devices may be electrically connected to each other in parallel. The plurality of magnetic tunnel junction devices may be arranged apart from each other with an empty space between the plurality of magnetic tunnel junction devices.

According to an example embodiment, a transmissive cap may be arranged on the pixel 100 for a long-wave infrared sensor. The transmissive cap may receive incident light. For example, the incident light may include long-wave infrared light. The transmissive cap may selectively transmit long-wave infrared light of the incident light. The long-wave infrared light may arrive at an optical absorber layer 210 to be described below with reference to FIGS. 5 and 6.

According to an example embodiment, the optical absorber layer 210 may absorb the long-wave infrared light to generate heat. The heat generated by the optical absorber layer 210 may vary according to an intensity of the long-wave infrared light. The heat generated by the optical absorber layer 210 may be transmitted to a magnetic tunnel junction device 140. Accordingly, the temperature of the magnetic tunnel junction device 140 may be increased. The magnetic tunnel junction device 140 may have resistance that changes according to the temperature. For example, when the temperature of the magnetic tunnel junction device 140 increases, the resistance of the magnetic tunnel junction device 140 may be lowered.

The magnetic tunnel junction device 140 included in the pixel 100 for a long-wave infrared sensor may be heated by incident light transmitted through the transmissive cap and the optical absorber layer 210, and the resistance of the magnetic tunnel junction device 140 may be changed according to the temperature change of the magnetic tunnel junction device 140.

According to an example embodiment, the sensitivity of the sensor changes based on the temperature coefficient of resistance (TCR). For example, as the TCR increase, the sensitivity of the sensor increases, and as the TCR decreases, the sensitivity of the sensor decreases. That is, the higher the TCR according to a specific temperature of a material, the higher the sensor sensitivity, according to the sensor sensitivity relation of the uncooled type long-wave infrared sensor. On the other hand, a low TCR value may lead to low sensor sensitivity.

The substrate 110 may include a semiconductor material. For example, the substrate 110 may include silicon (Si), germanium (Ge), or silicon germanium (SiGe). The substrate 110 may include electronic devices and wires. For example, the substrate 110 may be a readout integrated circuit (ROIC) substrate configured to control a long-wave infrared sensor 200 illustrated in FIG. 4.

According to an example embodiment, a protective layer 150 may be provided on the substrate 110. The protective layer 150 may include an insulating material. For example, the protective layer 150 may include an oxide, a nitride, or a combination thereof. For example, the protective layer 150 may include at least one of $SiO_2$, $Al_2O_3$, $HfO_2$, and $Si_xN_y$.

According to an example embodiment, the protective layer 150 may surround a lateral surface of the magnetic tunnel junction device 140. That is, the protective layer 150 may be provided on all sides of the magnetic tunnel junction device 140. According to an example embodiment, after the protective layer 150 is formed to surround the lateral surface of the magnetic tunnel junction device 140, a substantial part of the protective layer 150 may be removed by an etching process, and accordingly, the magnetic tunnel junction devices 140 may be arranged apart from each other with an empty space between the magnetic tunnel junction devices 140. The formation of the protective layer 150 is further described with reference to a manufacturing method.

A thickness of the protective layer 150 may be greater than 0 nm and less than or equal to 100 nm; however, the disclosure is not limited thereto.

The lower electrode 120 and the upper electrode 130 may be provided on the substrate 110. The lower electrode 120 and the upper electrode 130 may include at least one of titanium nitride film (TiN), platinum (Pt), palladium (Pd), tungsten (W), titanium (Ti), aluminum (Al), nickel (Ni), nickel-chrome (NiCr) alloy, copper (Cu), and gold (Au).

A plurality of magnetic tunnel junction devices 140 may be provided on the lower electrode 120 on the substrate 110. The magnetic tunnel junction device 140 may be a sensing material, and unlike existing planar sensing materials, the magnetic tunnel junction device 140 may be stacked in a vertical direction with respect to the lower electrode 120 and the substrate 110.

Figure 2:
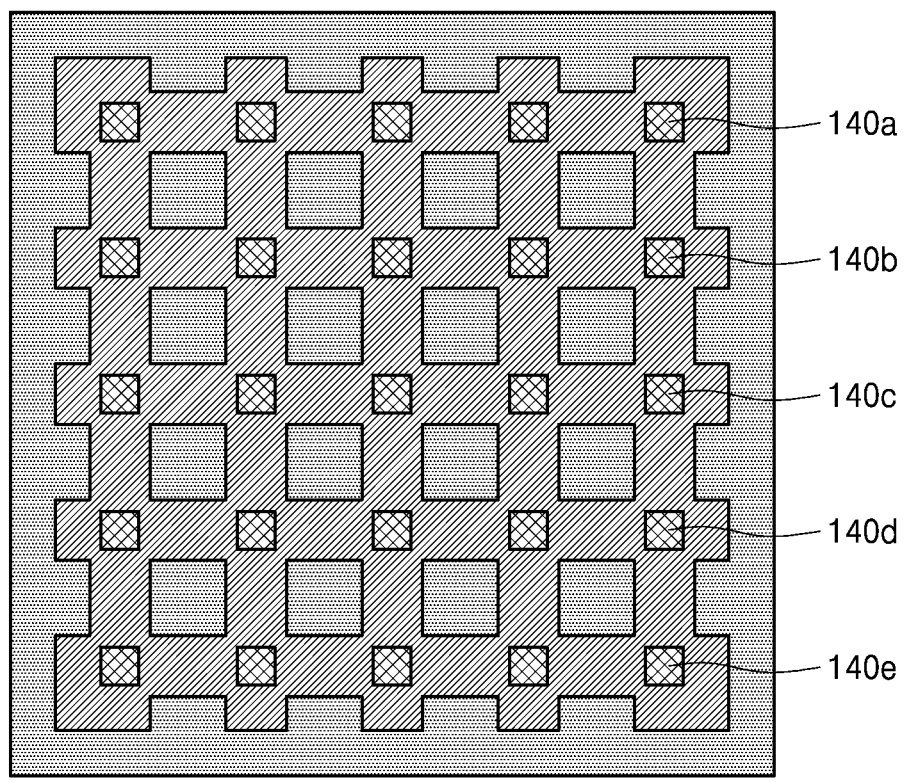
FIG. 2 is a diagram illustrating a structure of a pixel for a long-wave infrared sensor according to an example embodiment.

FIG. 2 is a diagram illustrating a structure of a pixel for a long-wave infrared sensor according to an example embodiment. According to an example embodiment, the long-wave infrared sensor may include a pixel array that includes at least one pixel.

Referring to FIG. 2, each pixel may be configured such that a plurality of magnetic tunnel junction devices (140a, 140b, 140c, 140d, 140e, . . . ) are electrically connected to each other in parallel on a two-dimensional (2D) plane. More specifically, the plurality of magnetic tunnel junction devices may be arranged in a matrix of M×N (M and N are each a natural number greater than or equal to 1). The plurality of magnetic tunnel junction devices may be arranged apart from each other with a certain empty space therebetween. A plurality of pixels for a long-wave infrared sensor in which the plurality of magnetic tunnel junction devices are connected in parallel may be formed, and theses pixels may be connected in series to constitute a pixel array of the long-wave infrared sensor. Detailed description thereof will be provided below.

Figure 3A:
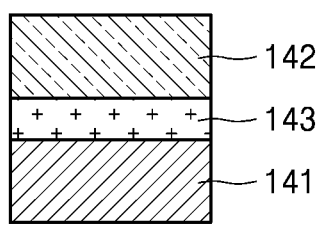
FIGS. 3A to 3C are diagrams illustrating in detail an inner structure of a magnetic tunnel junction device according to an example embodiment.
Figure 3B:
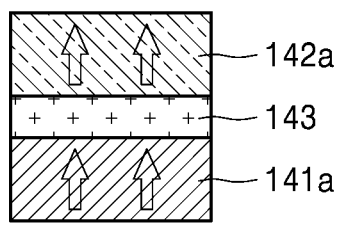
Figure 3C:
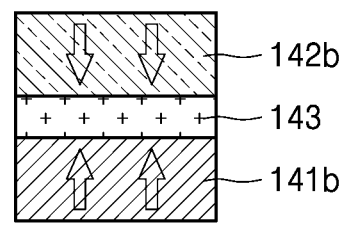

FIGS. 3A to 3C are diagrams illustrating in detail an inner structure of a magnetic tunnel junction device according to an example embodiment.

Referring to FIGS. 3A to 3C, the magnetic tunnel junction device may include a first magnetic layer, a second magnetic layer, and an insulating layer. The magnetic tunnel junction device may include the first magnetic layer (141a and 141b) having a fixed magnetization direction and the second magnetic layer (142a and 142b) having a variable magnetization direction.

According to an example embodiment, the magnetic tunnel junction device 140 may include a first magnetic layer 141 arranged on an upper surface of the lower electrode 120, a second magnetic layer 142 arranged on a lower surface of the upper electrode 130, and an insulating layer 143 arranged between the first magnetic layer 141 and the second magnetic layer 142. The second magnetic layer 142 may have a variable magnetization direction and the first magnetic layer 141 may have a fixed magnetization direction. Detailed description thereof will be provided below.

The first magnetic layer (141a and 141b) may be a pinned layer having a fixed magnetization direction. The second magnetic layer (142a and 142b) may be a free layer having a magnetization direction variable in a parallel or anti-parallel direction with the magnetization direction of the first magnetic layer (141a and 141b). In the disclosure, a state in which the magnetization direction of the second magnetic layer 142b is parallel with the magnetization direction of the first magnetic layer 141 is referred to as a parallel state and a state in which the magnetization direction of the second magnetic layer 142b is anti-parallel with the magnetization direction of the first magnetic layer 141 is referred to as an anti-parallel state.

In an example embodiment, the first magnetic layer 141 may have a vertical magnetization direction which is fixed in one direction perpendicular to an upper surface of the substrate 110. The first magnetic layer 141 may include a ferromagnetic material. For example, the first magnetic layer 141 may include at least one of a Fe alloy, a Co alloy, and a Ni alloy which are magnetic. For example, the first magnetic layer 141 may have at least one of cobalt iron boron (CoFeB), Cobalt iron (CoFe), nickel iron (NiFe), cobalt iron platinum (CoFePt), cobalt iron palladium (CoFePd), cobalt iron chrome (CoFeCr), cobalt iron terbium (CoFeTb), cobalt iron gadolinium (CoFeGd), and cobalt iron nickel (CoFeNi). For example, a thickness of the first magnetic layer 141 may be less than or equal to 1 µm. However, the disclosure is not limited thereto.

The second magnetic layer 142 may be provided on the first magnetic layer 141. The second magnetic layer 142 may have a magnetization direction variable according to the temperature. When the first magnetic layer 141 has a vertical magnetization direction, the second magnetic layer 142 may have a magnetization direction perpendicular to the upper surface of the substrate 110. The second magnetic layer 142 may include at least one of a Fe alloy, a Co alloy, and a Ni alloy which are magnetic. For example, the second magnetic layer 142 may have at least one of cobalt iron boron (CoFeB), Cobalt iron (CoFe), nickel iron (NiFe), cobalt iron platinum (CoFePt), cobalt iron palladium (CoFePd), cobalt iron chrome (CoFeCr), cobalt iron terbium (CoFeTb), cobalt iron gadolinium (CoFeGd), and cobalt iron nickel (CoFeNi). For example, a thickness of the second magnetic layer 142 may be less than or equal to 1 µm. However, the disclosure is not limited thereto.

A magnetic tunnel junction device in the anti-parallel state may have a greater resistance than t a magnetic tunnel junction device in the parallel state. The magnetic tunnel junction device in the anti-parallel state may have temperature dependency which shows a magnetization direction varying according to the temperature. For example, although the free layer of the magnetic tunnel junction device in the anti-parallel state has a magnetization direction which is anti-parallel with a magnetization direction of the pinned layer at a low temperature, when the temperature increases, the magnetization direction of the free layer may be distorted in a direction parallel with the magnetization direction of the pinned layer. The dependency of the magnetic tunnel junction device in the anti-parallel state may be represented by TCR. The resistance of the magnetic tunnel junction device in the anti-parallel state may be lowered when the temperature of the magnetic tunnel junction device increases. For example, the change amount of resistance per temperature of the magnetic tunnel junction device in the anti-parallel state may be 0.15%/K to 0.3%/K.

Figure 4:
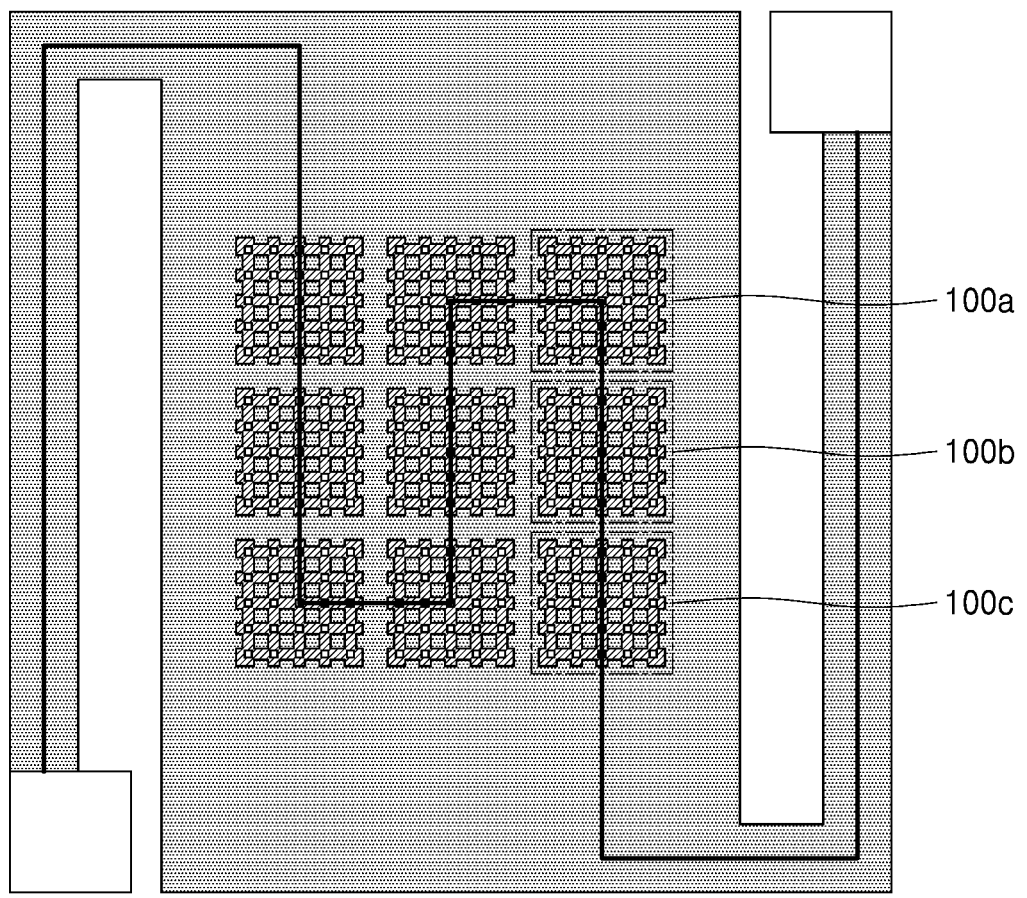
FIG. 4 is a schematic diagram of a long-wave infrared sensor according to an example embodiment.

FIG. 4 is a schematic diagram of a long-wave infrared sensor according to an example embodiment.

Referring to FIG. 4, a pixel array including a plurality of pixels (100a, 100b, 100c, . . . ) for a long-wave infrared sensor 200 which are arranged in a 2D manner may be provided, and the plurality of pixels (100a, 100b, 100c, . . . ) for a long-wave infrared sensor 200 may be arranged on the pixel array. Each pixel may include a plurality of magnetic tunnel junction devices connected to each other in parallel.

The plurality of pixels may be arranged on the substrate 110, and a through hole having a certain shape may be formed in the substrate. However, the disclosure is not limited thereto, and the through hole may have various shapes.

Figure 5:
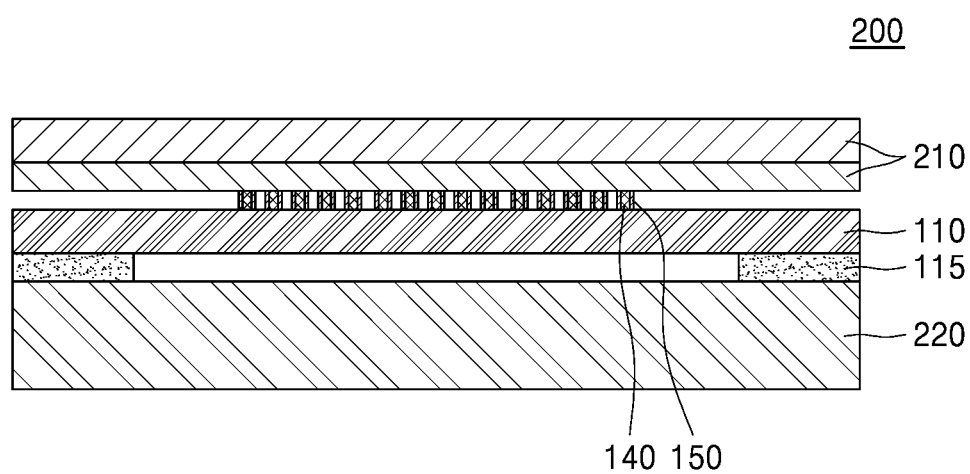
FIG. 5 is a cross-sectional view of a long-wave infrared sensor according to an example embodiment.

FIG. 5 is a cross-sectional view of a long-wave infrared sensor 200 according to an example embodiment.

Referring to FIG. 5, the substrate 110 may be arranged on a drive circuit 220, the plurality of magnetic tunnel junction devices 140 and the protective layer 150 surrounding the lateral surface of each of the magnetic tunnel junction devices 140 may be arranged on the substrate 110, and the optical absorber layer 210 may be arranged to cover the plurality of magnetic tunnel junction devices 140 and the protective layer 150. According to an example embodiment, an intermediate layer 115 may be provided between the drive circuit and the substrate 110 of the long-wave infrared sensor 200.

As described above, the transmissive cap may be arranged on the long-wave infrared sensor 200. The transmissive cap may receive incident light. For example, the incident light may include long-wave infrared light. The transmissive cap may selectively transmit long-wave infrared light of the incident light. The long-wave infrared light may arrive at the optical absorber layer 210.

The optical absorber layer 210 may absorb the long-wave infrared light to generate heat. The heat generated by the optical absorber layer 210 may vary according to an intensity of the long-wave infrared light. The heat generated by the optical absorber layer 210 may be transmitted to a magnetic tunnel junction device 140. Accordingly, the temperature of the magnetic tunnel junction device 140 may be increased.

The resistance change and the sensor sensitivity according to temperature change of the magnetic tunnel junction device 140 are as described with reference to FIG. 1.

As mentioned above, the plurality of magnetic tunnel junction devices (140a, 140b, 140c, . . . ) may be arranged in a matrix of M×N (M and N each are a natural number greater than or equal to 1) on the pixel array.

The thickness of the protective layer 150 may be greater than 0 nm and less than or equal to 100 nm; however, the disclosure is not limited thereto.

The drive circuit 220 according to an example embodiment may include an ROIC configured to detect characteristics changes of each detection device. The drive circuit 220 may drive pixels (100a, 100b, 100c, . . . ) of the pixel array and read data from an infrared light detection device or a resistive infrared light device to detect a temperature of a measurement target object. According to an example embodiment, the drive circuit 220 may drive the pixels of the pixel array in an order. According to an example embodiment, the drive circuit 220 may drive all the pixels of the pixel array.

According to an example embodiment, the drive circuit 220 may further include a bias circuit configured to generate a bias signal, a row select circuit configured to selectively activate a detection device, a column select circuit, column channel amplifier circuits, a sample and hold circuit, a column multiplexer, an output buffer circuit, etc.

The drive circuit 220 may receive and output a sensing current passing through the magnetic tunnel junction device 140, and determine resistance of the magnetic tunnel junction device 140 based on the received sensing current data. The drive circuit 220 may provide resistance change information of the magnetic tunnel junction device 140 to a processor.

According to an example embodiment, the processor may determine an intensity of long-wave infrared light based on the resistance change information. For example, the processor may derive a temperature of the magnetic tunnel junction device 140 corresponding to an average resistance of the magnetic tunnel junction device 140, further derive a quantity of heat emitted from the optical absorber layer 210 from the derived temperature, and then determine an intensity of long-wave infrared light to emit the quantity of heat from the optical absorber layer 210.

The optical absorber layer 210 may absorb light to generate heat. For example, the optical absorber layer 210 may selectively absorb long-wave infrared light. In an example embodiment, the optical absorber layer 210 may include a SiNx layer, a NiCr layer, and a SiNx layer which are sequentially stacked in a direction perpendicular to the upper surface of the substrate 110. The thickness of the optical absorber layer 210 may be 3 μm to 5 μm. A thickness ratio among the SiNx layer, the NiCr layer, and the SiNx layer may be determined according to the need. A distance between the optical absorber layer 210 and the magnetic tunnel junction devices (140a, 140b, 140c, . . . ) may be less than or equal to 1 μm.

As the temperature of the magnetic tunnel junction device 140 in the anti-parallel state is increased by heat, the resistance of the magnetic tunnel junction device 140 in the anti-parallel state may be lowered. The temperature of a magnetic resistance device in the parallel state may be increased by heat as well; however, the magnetic resistance device in the parallel state does not substantially have temperature dependency, and thus, may have a constant resistance.

Figure 6:
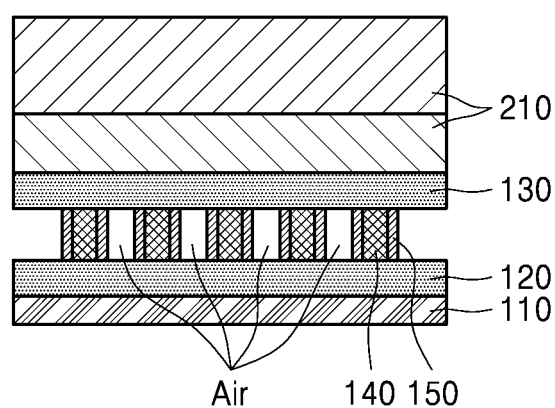
FIG. 6 is a diagram illustrating in detail a cross-section view of a long-wave infrared sensor according to an example embodiment.

FIG. 6 is a diagram illustrating in detail a cross-section view of a long-wave infrared sensor according to an example embodiment.

Referring to FIG. 6, on the substrate 110, the lower electrode 120 and the upper electrode 130 may be arranged apart from each other, and the plurality of magnetic tunnel junction devices 140 and the protective layer 150 surrounding the lateral surface of each of the magnetic tunnel junction devices 140 may be provided. The optical absorber layer 210 covering the magnetic tunnel junction device 140 and the protective layer 150 may be provided.

The sensing sensitivity of the long-wave infrared sensor 200 according to an example embodiment may be represented by the following formula:

$$\Re(V/W) = \frac{\Delta V}{P_{in}} = \frac{I_b \cdot R \cdot (\alpha \cdot \Delta T)}{P_{in}}$$

($P_{in}$=input power, $I_b$=Readout current, $G_{th}$=Pixel thermal conductivity, α=TCR, ΔT=temperature change, η=heat absorption rate).

In addition, the formula among the temperature change, which is one of the parameters of the sensitivity of the long-wave infrared sensor 200, the thermal capacity, and the thermal conductivity of a sensing portion may be represented as follows:

$$\Delta T = \frac{P_{in} \cdot \eta}{\sqrt{G_{th}^2 + \omega^2 \cdot C_{th}^2}}$$

($C_{th}$: thermal capacity, $G_{th}$: thermal conductivity).

According to the formula above, under the same input power, the lower the thermal conductivity or the thermal capacity is, the higher the temperature change amount of the sensing portion of the long-wave infrared sensor 200 may be. When the temperature change amount increases, the sensitivity of the sensor may also increase. To lower the thermal capacity, a substantial part of the protective layer 150 surrounding the lateral surface of the magnetic tunnel junction device may be removed.

As mentioned above, the optical absorber layer 210 may absorb light to generate heat, and for example, the optical absorber layer 210 may selectively absorb long-wave infrared light. When the optical absorber layer 210 absorbs light and generates heat, both of the magnetic tunnel junction device 140 and the protective layer 150 are heated. The commonly used magnetic tunnel junction device has a size (diameter of 40 nm to 100 nm) smaller than the total pixel size (5 um to 50 um), and thus, a protective layer takes up more volume than the magnetic tunnel junction device. Due to the protective layer (e.g., $SiO_2$) which is irrelevant to the temperature sensing, the thermal capacity of a sensing portion may be increased, and the temperature rise ($\Delta T$) of the magnetic tunnel junction device may be limited. When the temperature increase of the magnetic tunnel junction device is limited, the sensing sensitivity may be lowered according to the above formula.

To overcome lowered sensing sensitivity, the protective layer (e.g., $SiO_2$) except for a part surrounding the magnetic tunnel junction device 140 of the long-wave infrared sensor 200 may be removed according to an example embodiment, thus the thermal capacity of the sensing portion may be lowered, which leads to increased sensitivity of the sensor. The method of removing the protective layer (e.g., $SiO_2$) except for the part surrounding the magnetic tunnel junction device 140 will be described later with reference to a manufacturing method.

Figure 7:
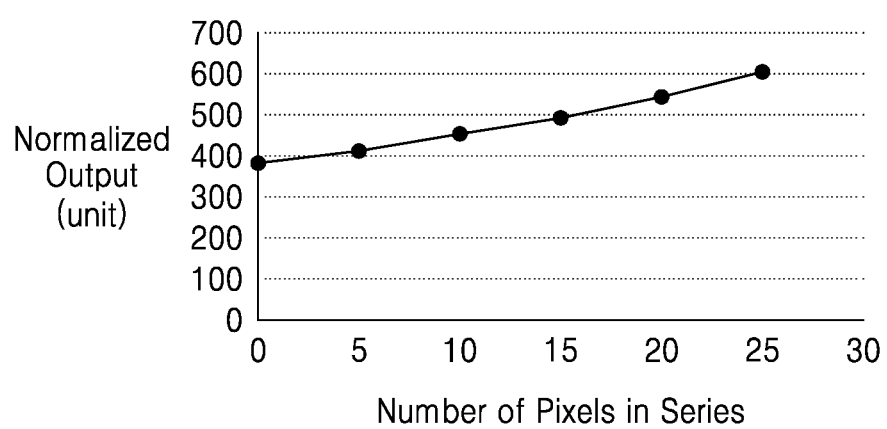
FIG. 7 is a graph showing a change in sensor sensitivity according the number of pixels for a long-wave infrared sensor according to an example embodiment.

FIG. 7 is a graph showing a change in sensor sensitivity according the number of pixels for a long-wave infrared sensor according to an example embodiment.

FIG. 7 shows the sensor sensitivity change according to the number of pixels for long-wave infrared sensor arranged in series in a single pixel array according to an example embodiment.

The resistance of the pixel array in which a plurality of pixels are arranged in a 2D manner and electrically connected to each other in series may be defined as the following relation formula:

$$\frac{R_{in} \text{ Unit Resistance}}{\# \text{ of } MTJ \text{ in Sub Pixel}} \times \# \text{ of Sub\_Pixel}$$

Here, sub pixel is pixel for long-wave infrared sensor, and MTJ in sub pixel is number of magnetic tunnel junction devices included in one pixel.

According to the above relation formula, when the number of magnetic tunnel junction devices included in one pixel increase, the resistance may be lowered; however, when the total resistance is increased by raising the number of pixels connected in series (e.g., 10 kΩ to 1000 kΩ), the overall sensor sensitivity may be increased according to the above relation formula. In this case, the number of magnetic tunnel junction devices included in one pixel or the number of pixels connected in series is not limited.

FIGS. 8A to 8F are diagrams illustrating a method of manufacturing a long-wave infrared sensor according to an example embodiment.

Figure 8A:
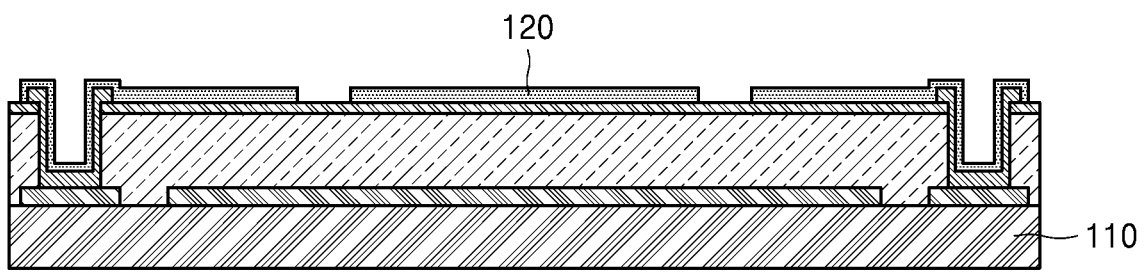
FIGS. 8A to 8F are diagrams illustrating a method of manufacturing a long-wave infrared sensor according to an example embodiment.

Referring to FIG. 8A, the substrate 110 and the lower electrode 120 may be provided. According to an example embodiment, a through hole having a certain shape may be formed in the substrate 110.

Figure 8B:
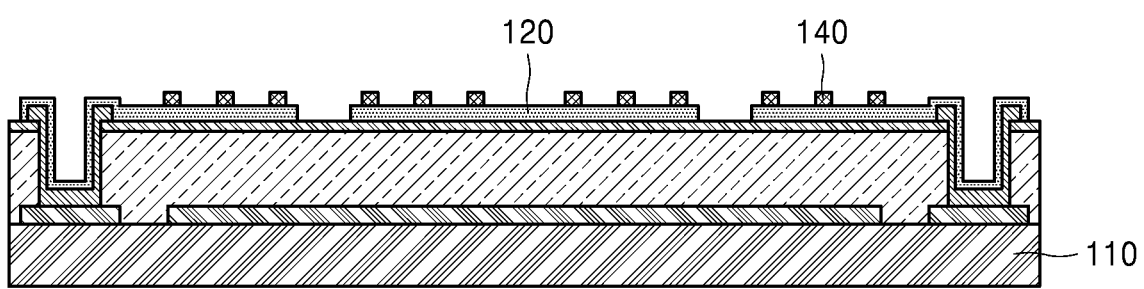

Referring to FIG. 8B, at least one magnetic tunnel junction device 140 may be formed on the substrate 110 and the lower electrode 120. The substrate 110, the lower electrode 120, and the magnetic tunnel junction device 140 may be as described with reference to FIGS. 1 and 5.

Figure 8C:
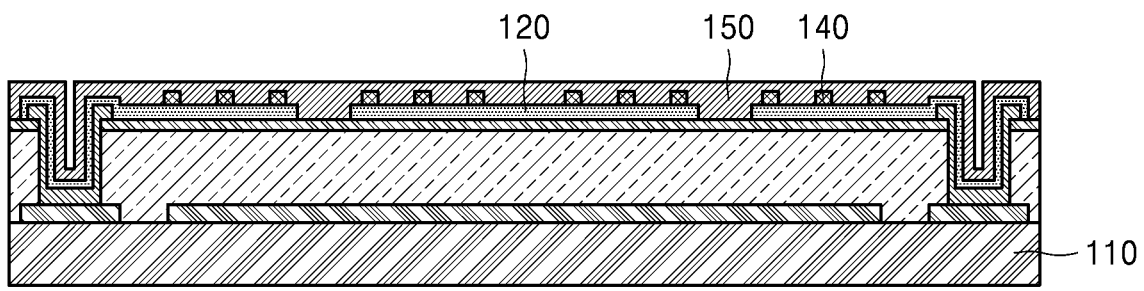

Referring to FIG. 8C, the protective layer 150 may be formed on the magnetic tunnel junction device 140. The protective layer 150 may include, for example, at least one of a silicon oxide, an aluminum oxide, a hafnium oxide, and a silicon nitride.

Figure 8D:
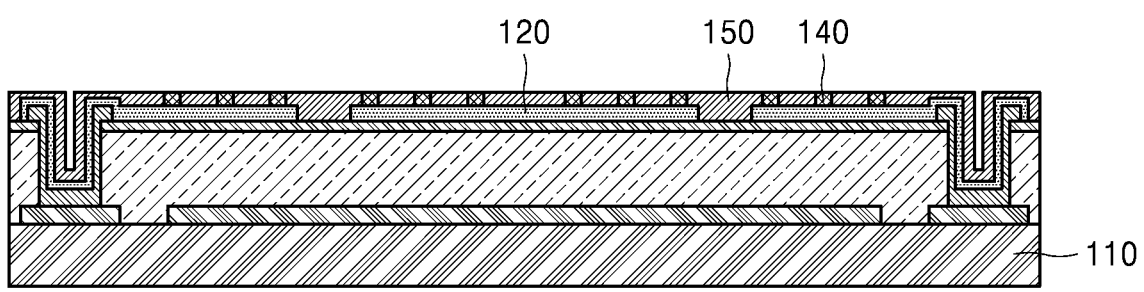

Referring to FIG. 8D, by performing the process of depositing the protective layer 150 on the magnetic tunnel junction device 140 and the process of planarizing the deposited protective layer 150, the upper surface of the plurality of magnetic tunnel junction devices 140 may be exposed.

Figure 8E:
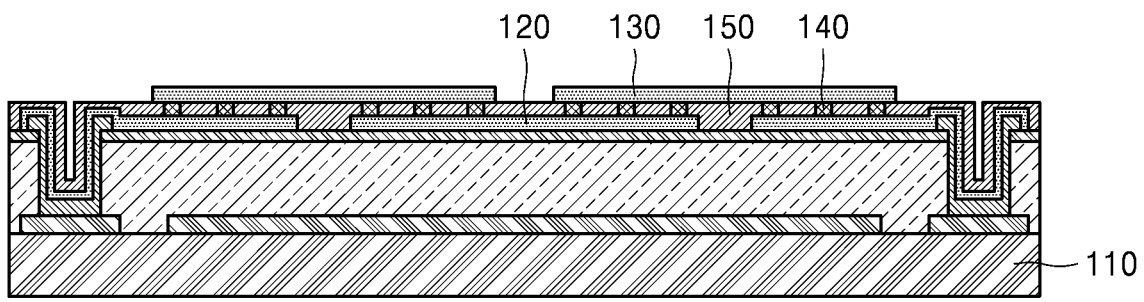

Referring to FIG. 8E, the upper electrode 130 may be formed on the plurality of magnetic tunnel junction devices 140 and the protective layer 150. In the process of forming the upper electrode 130, by using a pattern of the upper electrode 130, a part of the protective layer 150 surrounding the lateral part of the magnetic tunnel junction device 140 may be etched and removed. Through the etching process, the protective layer 150 may be removed in accordance with the pattern of the upper electrode 130.

Figure 8F:
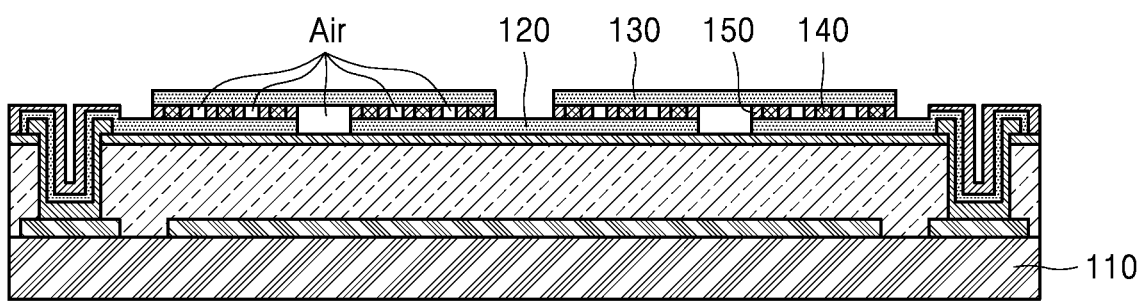

Referring to FIG. 8F, the plurality of magnetic tunnel junction devices 140 may be arranged apart from each other with a certain empty space (air) therebetween. As mentioned above, due to the certain empty space, the thermal capacity of the protective layer 150 may be reduced, which leads to improved sensing sensitivity of the long-wave infrared sensor.

According to an example embodiment, after etching the protective layer 150, by further depositing a sacrificial layer and the optical absorber layer 210, the long-wave infrared sensor 200 may be formed.

Figure 9:
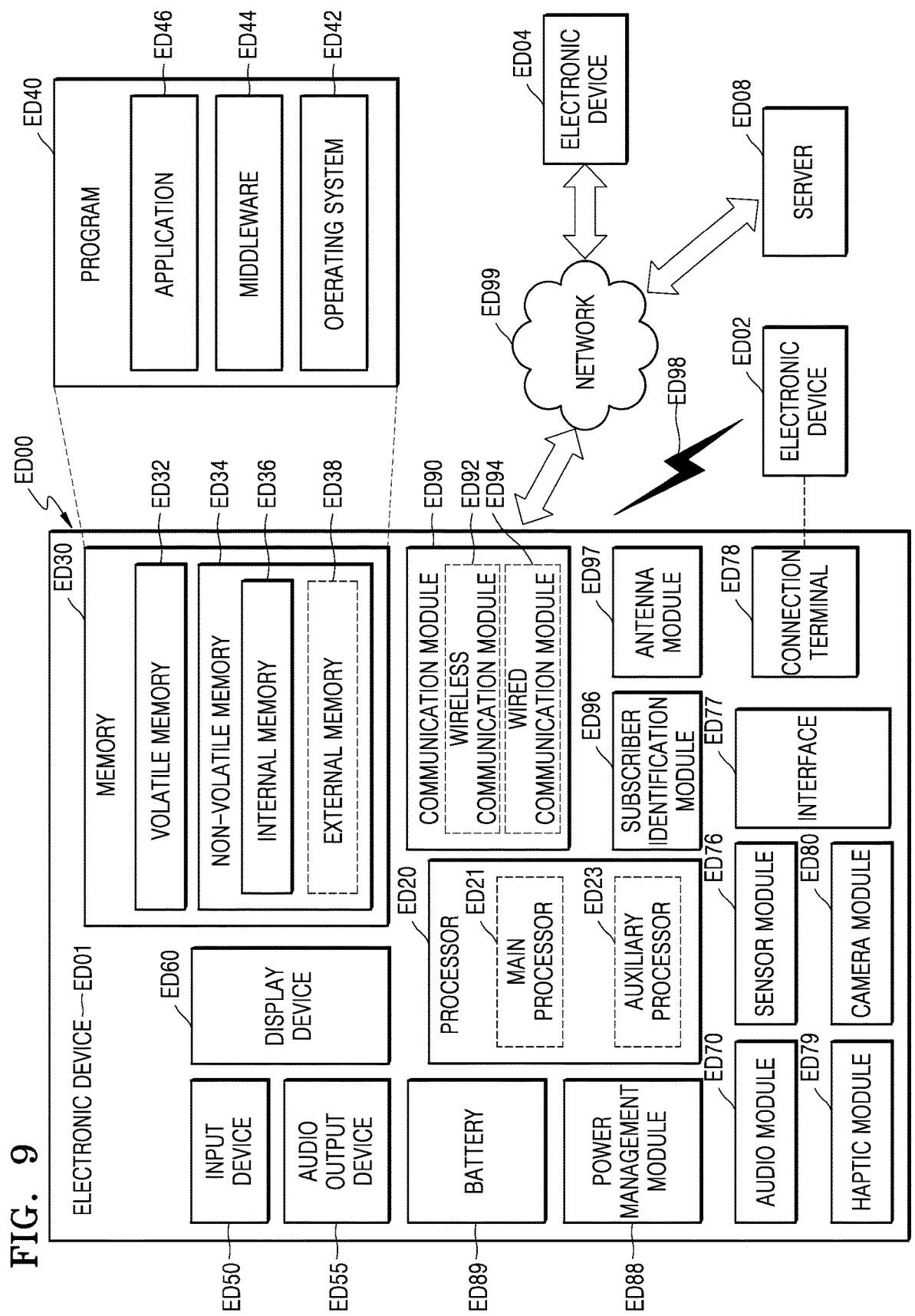
FIG. 9 is a block diagram of an electronic device including a long-wave infrared sensor according to an example embodiment.

FIG. 9 is a block diagram of an electronic device including a long-wave infrared sensor according to an example embodiment.

Referring to FIG. 9, in a network environment ED00, the electronic device ED01 may communicate with another electronic device ED02 through a first network ED98 (short-range wireless communication network, and the like), or communicate with another electronic device ED04 and/or a server ED08 through a second network ED99 (long-range wireless communication network, and the like). The electronic device ED01 may communicate with the electronic device ED04 through the server ED08. The electronic device ED01 may include a processor ED20, a memory ED30, an input device ED50, an audio output device ED55, a display device ED60, an audio module ED70, a sensor module ED76, an interface ED77, a haptic module ED79, a camera module ED80, a power management module ED88, a battery ED89, a communication module ED90, a subscriber identification module ED96, and/or an antenna module ED97. In the electronic device ED01, some (the display device ED60, and the like) of constituent elements may be omitted or other constituent elements may be added. Some of the constituent elements may be implemented by one integrated circuit. For example, the sensor module ED76 (a long-wave infrared sensor, a fingerprint sensor, an iris sensor, an illuminance sensor, and the like) may be implemented by being embedded in the display device ED60 (a display and the like). Furthermore, when the image sensor CM30 includes a spectral function, some functions (e.g., a color sensor and an illuminance sensor) of the sensor module ED76 may be implemented by the image sensor CM30, not by a separate sensor module.

The processor ED20 may control one or a plurality of other constituent elements (hardware and software constituent elements, and the like) of the electronic device ED01 connected to the processor ED20 by executing software (a program ED40, and the like), and perform various data processing or calculations. As part of the data processing or calculations, the processor ED20 may load, in a volatile memory ED32, commands and/or data received from other constituent elements (the sensor module ED76, the communication module ED90, and the like), process the command and/or data stored in the volatile memory ED32, and store result data in a non-volatile memory ED34. The processor ED20 may include a main processor ED21 (a central processing unit, an application processor, and the like) and an auxiliary processor ED23 (a graphics processing unit, an image signal processor, a sensor hub processor, a communication processor, and the like) that is operable independently of or together with the main processor ED21. The auxiliary processor ED23 may use less power than the main processor ED21 and may perform a specialized function.

Instead of the main processor ED21 when the main processor ED21 is in an inactive state (sleep state), or with the main processor ED21 when the main processor ED21 is in an active state (application execution state), the auxiliary processor ED23 may control functions and/or states related to some constituent elements (the display device ED60, the sensor module ED76, the communication module ED90, and the like) of the constituent elements of the electronic device ED01. The auxiliary processor ED23 (an image signal processor, a communication processor, and the like) may be implemented as a part of functionally related other constituent elements (the camera module ED80, the communication module ED90, and the like).

The memory ED30 may store various data needed by the constituent elements (the processor ED20, the sensor module ED76, and the like) of the electronic device ED01. The data may include, for example, software (the program ED40, and the like) and input data and/or output data about commands related thereto. The memory ED30 may include the volatile memory ED32 and/or the non-volatile memory ED34. The non-volatile memory ED34 may include an internal memory ED36 fixedly installed in the electronic device ED01 and an external memory ED38 that is removable.

The program ED40 may be stored in the memory ED30 as software, and may include an operating system ED42, middleware ED44, and/or an application ED46.

The input device ED50 may receive commands and/or data to be used for constituent elements (the processor ED20, and the like) of the electronic device ED01, from the outside (a user, and the like) of the electronic device ED01.

The input device ED50 may include a microphone, a mouse, a keyboard, and/or a digital pen (a stylus pen, and the like).

The audio output device ED55 may output an audio signal to the outside of the electronic device ED01. The audio output device ED55 may include a speaker and/or a receiver. The speaker may be used for general purposes such as multimedia playback or recording playback, and the receiver can be used to receive incoming calls. The receiver may be implemented by being coupled as a part of the speaker or by an independent separate device.

The display device ED60 may visually provide information to the outside of the electronic device ED01. The display device ED60 may include a display, a hologram device, or a projector, and a control circuit to control a corresponding device. The display device ED60 may include a touch circuitry set to detect a touch and/or a sensor circuit (a pressure sensor, and the like) set to measure the strength of a force generated by the touch.

The audio module ED70 may convert sound into electrical signals or reversely electrical signals into sound. The audio module ED70 may obtain sound through the input device ED50, or output sound through a speaker and/or a headphone of another electronic device (the electronic device ED02, and the like) connected to the audio output device ED55 and/or the electronic device ED01 in a wired or wireless manner.

The sensor module ED76 may detect an operation state (power, temperature, and the like) of the electronic device ED01, or an external environment state (a user state, and the like), and generate an electrical signal and/or a data value corresponding to a detected state. The sensor module ED76 may include a gesture sensor, a gyro sensor, a barometric pressure sensor, a magnetic sensor, an acceleration sensor, a grip sensor, a proximity sensor, a color sensor, an infrared (IR) sensor, a long-wave IR sensor, a biometric sensor, a temperature sensor, a humidity sensor, and/or an illuminance sensor. The long-wave infrared sensor may include any one of aforementioned long-wave infrared sensors.

The interface ED77 may support one or a plurality of specified protocols used for the electronic device ED01 to be connected to another electronic device (the electronic device ED02, and the like) in a wired or wireless manner. The interface ED77 may include a high definition multimedia interface (HDMI), a universal serial bus (USB) interface, an SD card interface, and/or an audio interface.

A connection terminal ED78 may include a connector for the electronic device ED01 to be physically connected to another electronic device (the electronic device ED02, and the like). The connection terminal ED78 may include an HDMI connector, a USB connector, an SD card connector, and/or an audio connector (a headphone connector, and the like).

The haptic module ED79 may convert electrical signals into mechanical stimuli (vibrations, movements, and the like) or electrical stimuli that are perceivable by a user through tactile or motor sensations. The haptic module ED79 may include a motor, a piezoelectric device, and/or an electrical stimulation device.

The camera module ED80 may capture a still image and a video. The camera module ED80 may include a lens assembly including one or a plurality of lenses, the image sensors, image signal processors, and/or flashes. The lens assembly included in the camera module ED80 may collect light emitted from a subject for image capturing.

The power management module ED88 may manage power supplied to the electronic device ED01. The power management module ED88 may be implemented as a part of a power management integrated circuit (PMIC).

The battery ED89 may supply power to the constituent elements of the electronic device ED01. The battery ED89 may include non-rechargeable primary cells, rechargeable secondary cells, and/or fuel cells.

The communication module ED90 may establish a wired communication channel and/or a wireless communication channel between the electronic device ED01 and another electronic device (the electronic device ED02, the electronic device ED04, the server ED08, and the like), and support a communication through an established communication channel. The communication module ED90 may be operated independent of the processor ED20 (the application processor, and the like), and may include one or a plurality of communication processors supporting a wired communication and/or a wireless communication. The communication module ED90 may include a wireless communication module ED92 (a cellular communication module, a short-range wireless communication module, a global navigation satellite system (GNSS) communication module, and the like), and/or a wired communication module ED94 (a local area network (LAN) communication module, a power line communication module, and the like). Among the above communication modules, a corresponding communication module may communicate with another electronic device through the first network ED98 (a short-range communication network such as Bluetooth, WiFi Direct, or infrared data association (IrDA)) or the second network ED99 (a long-range communication network such as a cellular network, the Internet, or a computer network (LAN, WAN, and the like)). These various types of communication modules may be integrated into one constituent element (a single chip, and the like), or may be implemented as a plurality of separate constituent elements (multiple chips). The wireless communication module ED92 may verify and authenticate the electronic device ED01 in a communication network such as the first network ED98 and/or the second network ED99 by using subscriber information (an international mobile subscriber identifier (IMSI), and the like) stored in the subscriber identification module ED96.

The antenna module ED97 may transmit signals and/or power to the outside (another electronic device, and the like) or receive signals and/or power from the outside. An antenna may include an emitter formed in a conductive pattern on a substrate (a printed circuit board (PCB), and the like). The antenna module ED97 may include one or a plurality of antennas. When the antenna module ED97 includes a plurality of antennas, the communication module ED90 may select, from among the antennas, an appropriate antenna for a communication method used in a communication network such as the first network ED98 and/or the second network ED99. Signals and/or power may be transmitted or received between the communication module ED90 and another electronic device through the selected antenna. Other parts (an RFIC, and the like) than the antenna may be included as a part of the antenna module ED97.

Some of the constituent elements may be connected to each other through a communication method between peripheral devices (a bus, general purpose input and output (GPIO), a serial peripheral interface (SPI), a mobile industry processor interface (MIPI), and the like) and may mutually exchange signals (commands, data, and the like).

The command or data may be transmitted or received between the electronic device ED01 and the external electronic device ED04 through the server ED08 connected to the second network ED99. The electronic devices ED02 and ED04 may be of a type that is the same as or different from the electronic device ED01. All or a part of operations executed in the electronic device ED01 may be executed in one or a plurality of the electronic devices (ED02, ED04, and ED08). For example, when the electronic device ED01 needs to perform a function or service, the electronic device ED01 may request one or a plurality of electronic devices to perform part of the whole of the function or service, instead of performing the function or service. The one or a plurality of the electronic devices receiving the request may perform additional function or service related to the request, and transmit a result of the performance to the electronic device ED01. To this end, cloud computing, distributed computing, and/or client-server computing technology may be used.

Figure 10:
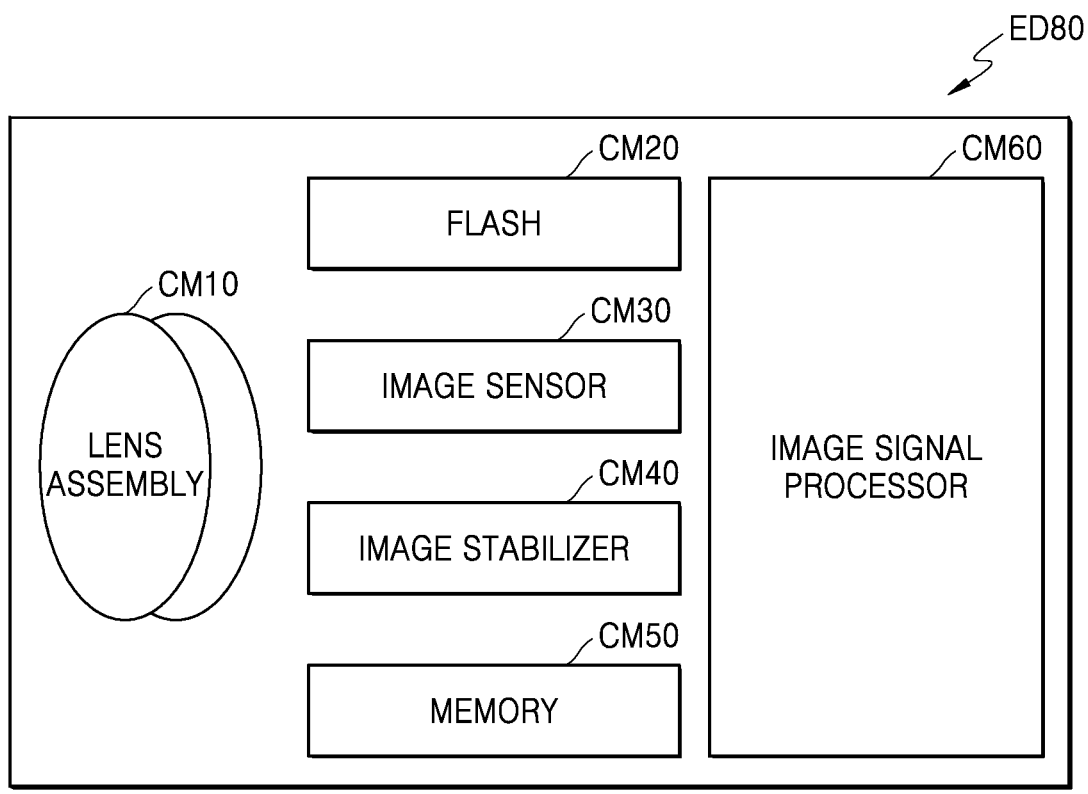
FIG. 10 is a schematic block diagram of a camera module of FIG. 9.
Figure 11:
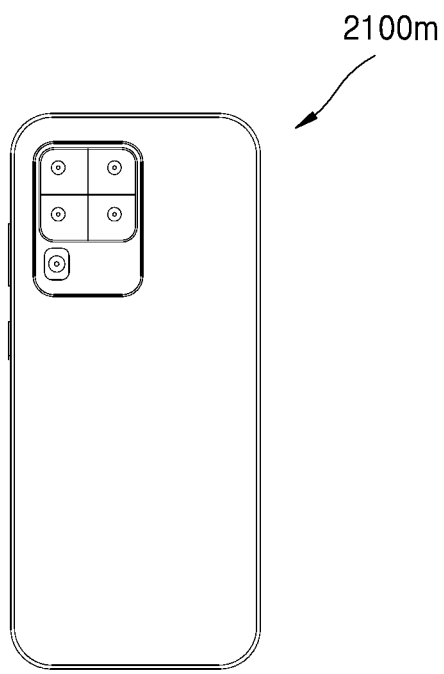
FIGS. 11 to 20 are diagrams illustrating various examples of an electronic device to which long-wave infrared sensors according to embodiments are applied.
Figure 12:
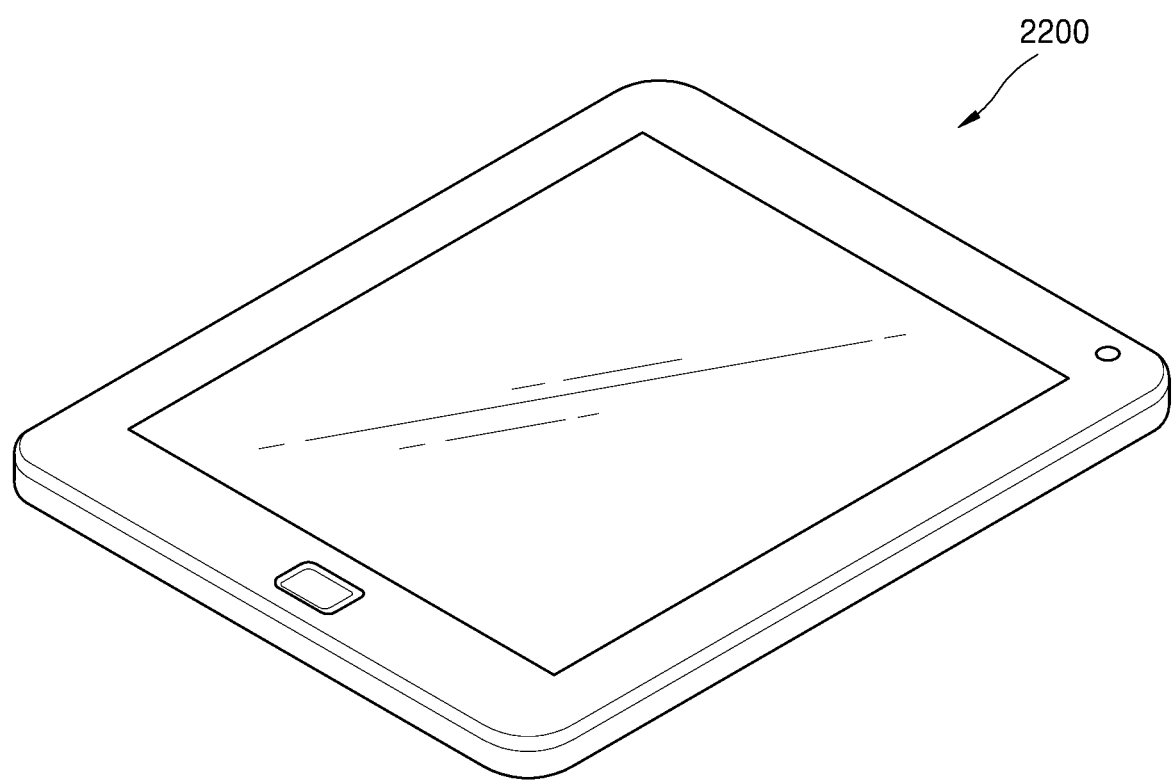
Figure 13:
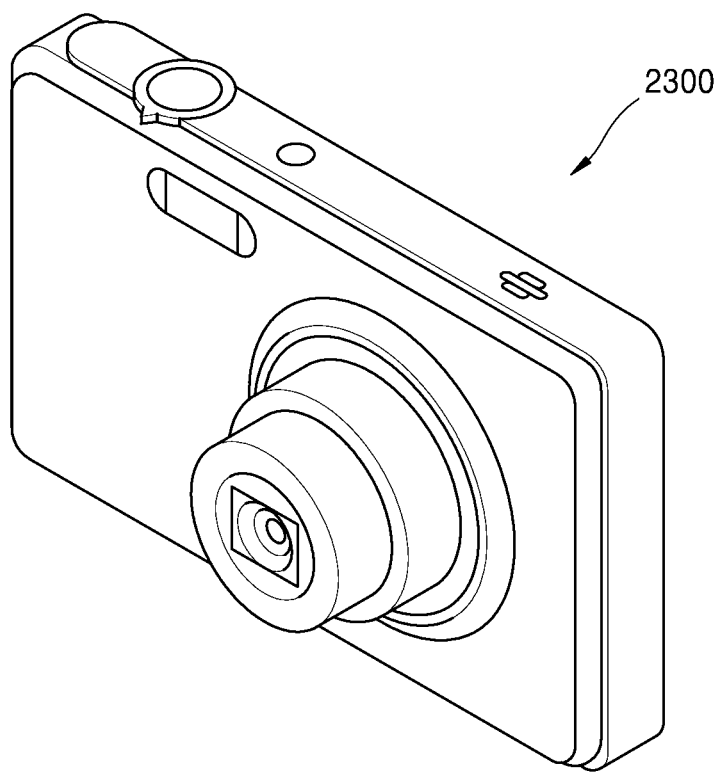
Figure 14:
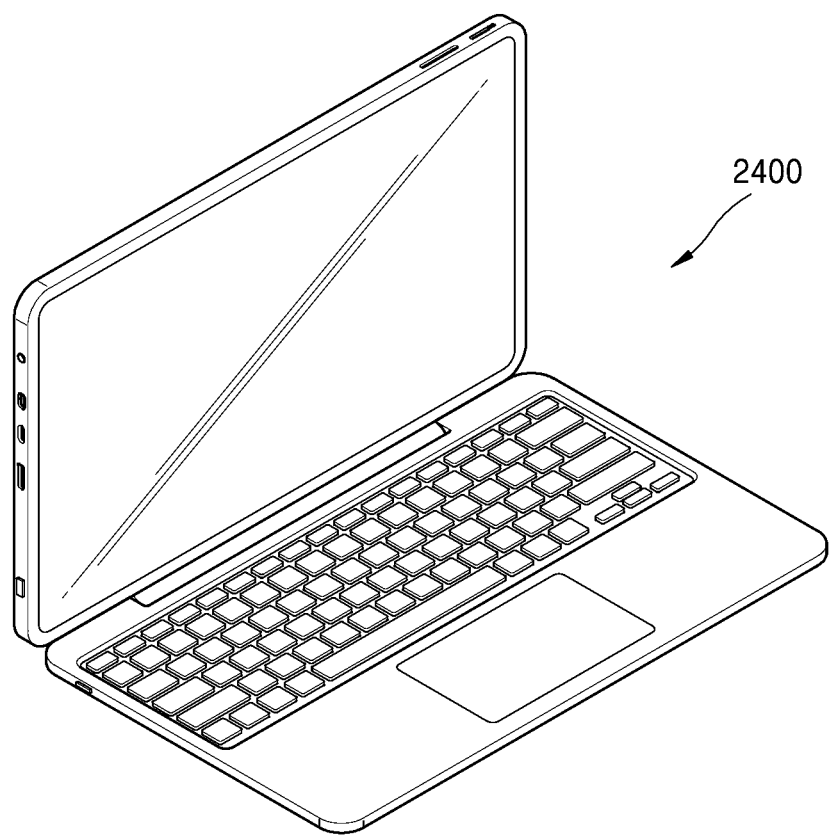
Figure 15:
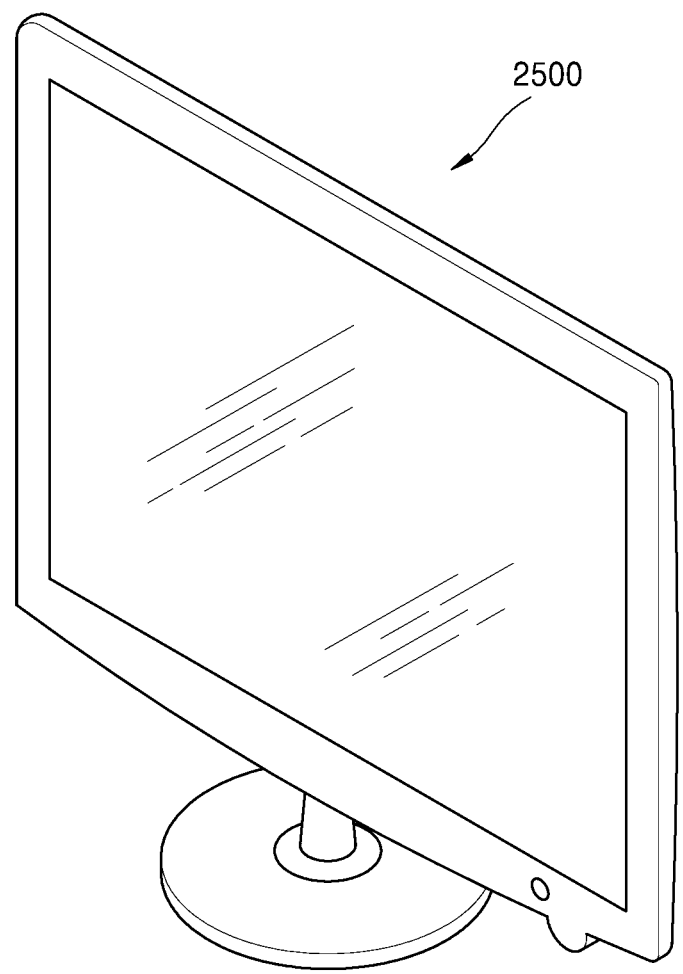

FIG. 10 is a schematic block diagram of the camera module of FIG. 9.

Referring to FIG. 10, the camera module ED80 may comprise a lens assembly CM10, a flash CM20, an image sensor CM30, an image stabilizer CM40, a memory CM50 (e.g., a buffer memory, etc.), and/or an image signal processor CM60.

The lens assembly CM10 may collect light emitted from a subject for image capturing. The camera module ED80 may include a plurality of lens assemblies CM10, and in this case, the camera module ED80 may include a dual camera, a 360 degrees camera, or a spherical camera. Some of the lens assemblies CM10 may have the same lens attributes (a viewing angle, a focal length, auto focus, F Number, optical zoom, and the like), or different lens attributes. The lens assembly CM10 may include a wide angle lens or a telescopic lens.

The flash CM20 may emit light used to reinforce light emitted or reflected from a subject. The flash CM20 may include one or a plurality of light-emitting diodes (a red-green-blue (RGB) LED, a white LED, an infrared LED, an ultraviolet LED, and the like), and/or a xenon lamp. The image sensor CM30 may obtain an image corresponding to an object by converting light, which has been emitted or reflected from the object and then transmitted via the lens assembly CM10, into electric signals. The image sensor CM30 may further include one or more sensors selected from image sensors having different attributes, such as an RGB sensor, a black and white (BW) sensor, an infrared (IR) sensor other than a long-wave IR sensor, and an ultraviolet sensor, in addition to the long-wave IR sensor. The long-wave infrared sensor may include any one of aforementioned long-wave infrared sensors.

The image stabilizer CM40 may move, in response to a movement of the camera module ED80 or an electronic device ED01 including the same, one or a plurality of lenses included in the lens assembly CM10 or the image sensor CM30 in a particular direction or may compensate a negative affect due to the movement by controlling (adjusting a read-out timing, and the like) the movement characteristics of the image sensor CM30. The image stabilizer CM40 may detect a movement of the camera module ED80 or the electronic device ED01 by using a gyro sensor or an acceleration sensor arranged inside or outside the camera module ED80. The image stabilizer CM40 may be implemented in an optical form.

The memory CM50 may store a part or entire data of an image obtained through the image sensor CM30 for a subsequent image processing operation. For example, when a plurality of images are obtained at high speed, only low resolution images are displayed while the obtained original data (Bayer-Patterned data, high resolution data, and the like) is stored in the memory CM50. Then, the memory CM50 may be used to transmit the original data of a selected (user selection, and the like) image to the image signal processor CM60. The memory CM50 may be incorporated into the memory ED30 of the electronic device ED01, or configured to be an independently operated separate memory.

The image signal processor CM60 may perform image processing on the image obtained through the image sensor CM30 or the image data stored in the memory CM50. The image processing may include depth map generation, three-dimensional modeling, panorama generation, feature point extraction, image synthesis, and/or image compensation (noise reduction, resolution adjustment, brightness adjustment, blurring, sharpening, softening, and the like). The image signal processor CM60 may perform control (exposure time control, or read-out timing control, and the like) on constituent elements (the image sensor CM30 and the like) included in the camera module ED80. The image processed by the image signal processor CM60 may be stored again in the memory CM50 for additional processing or provided to external constituent elements (the memory ED30, the display device ED60, the electronic device ED02, the electronic device ED04, the server ED08, and the like) of the camera module ED80. The image signal processor CM60 may be incorporated into the processor ED20, or configured to be a separate processor operated independently of the processor ED20. When the image signal processor CM60 is configured by a separate processor from the processor ED20, the image processed by the image signal processor CM60 may undergo additional image processing by the processor ED20 and then displayed through the display device ED60.

The electronic device ED01 may include a plurality of camera modules ED80 having different attributes or functions. In this case, one of the camera modules ED80 may be a wide angle camera, and another may be a telescopic camera. Similarly, one of the camera modules ED80 may be a front side camera, and another may be a read side camera.

FIGS. 11 to 20 are diagrams illustrating various examples of an electronic device to which image sensors according to embodiments are applied. The image sensor may be substantially identical to the image sensor CM30 described with reference to FIGS. 15 and 16.

Referring to FIGS. 11 to 20, the image sensor may be applied to various electronic devices. The image sensor may be applied to a mobile phone or a smartphone 2100*m* illustrated in FIG. 11, a tablet or a smart tablet 2200 illustrated in FIG. 12, a digital camera or a camcorder 2300 illustrated in FIG. 13, a laptop computer 2400 illustrated in FIG. 14, a television or a smart television 2500 illustrated in FIG. 15, etc. For example, the smartphone 2100*m* or the smart tablet 2200 may include a plurality of high-resolution cameras, each having a high-resolution image sensor mounted thereon, and by using such high-resolution cameras, depth information of subjects in an image may be extracted, out-focusing of the image may be adjusted, subjects in the image may be automatically identified, or thermal images of subjects in the mage may be obtained.

Figure 16:
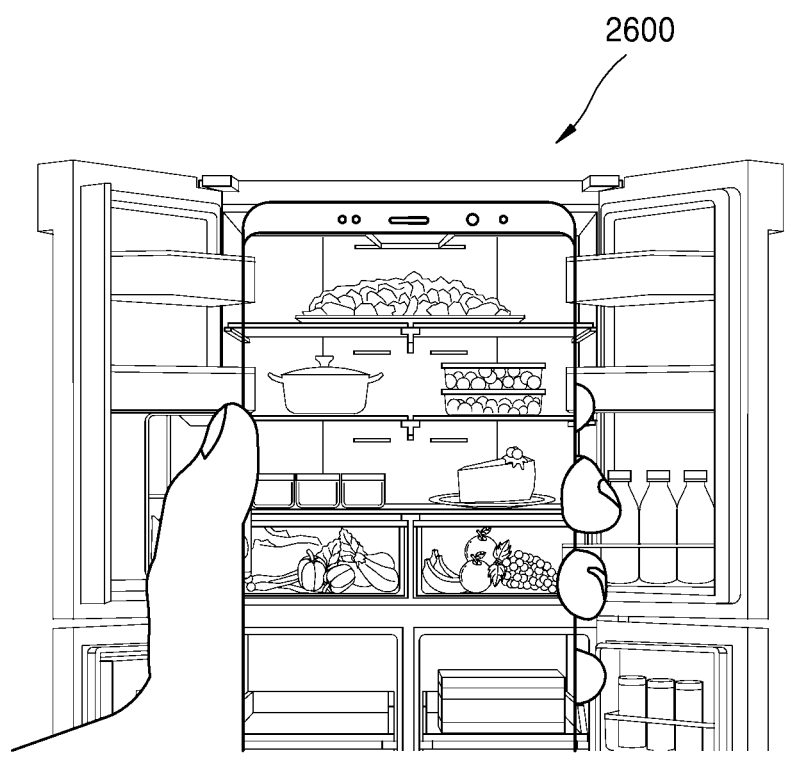
Figure 17:
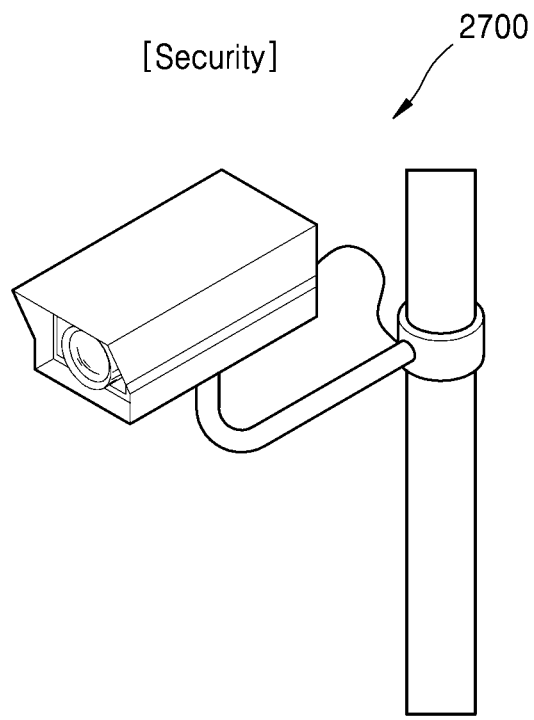
Figure 18:
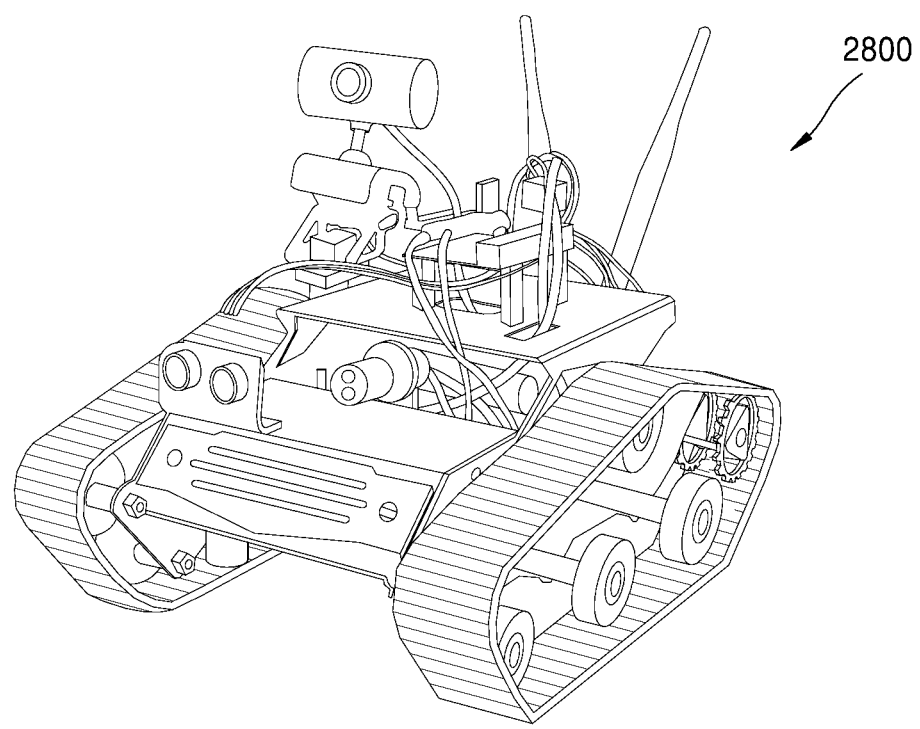
Figure 19:
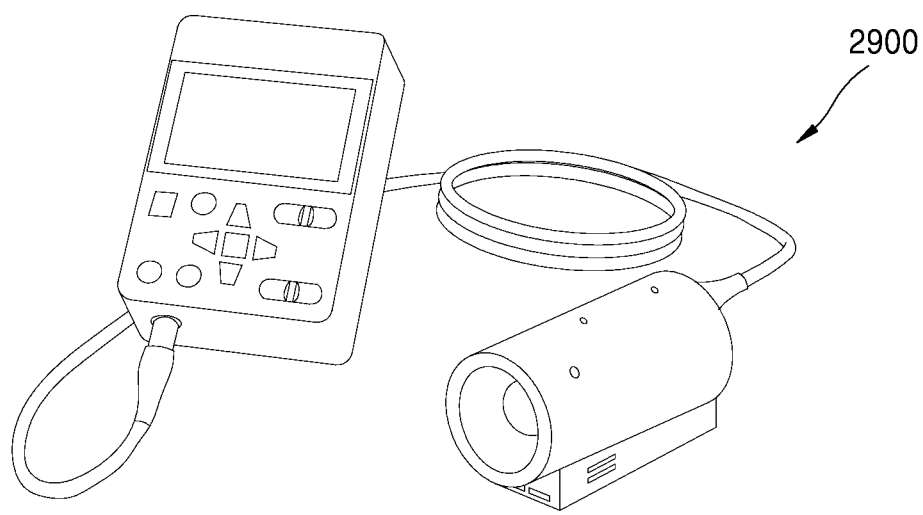

Furthermore, the image sensor may be applied to a smart refrigerator 2600 illustrated in FIG. 16, a security camera 2700 illustrated in FIG. 17, a robot 2800 illustrated in FIG. 18, a medical camera 2900 illustrated in FIG. 19, and the like. For example, the smart refrigerator 2600 may obtain thermal images of foods in a refrigerator by using an image sensor, automatically recognize food in a refrigerator, and notify a user of the presence of a particular food, the type of food that is input or output, and the like, through a smartphone. The security camera 2700 may provide an ultrahigh-resolution image and a thermal image and may recognize an object or a person in an image in a dark environment by using high sensitivity. The robot 2800 may be provided in a disaster or industrial site that is not directly accessible by people, and may provide a high-resolution image and a thermal image. The medical camera 2900 may provide a high-resolution image and a thermal image for diagnosis or surgery, and thus, a field of vision may be dynamically adjusted.

Figure 20:
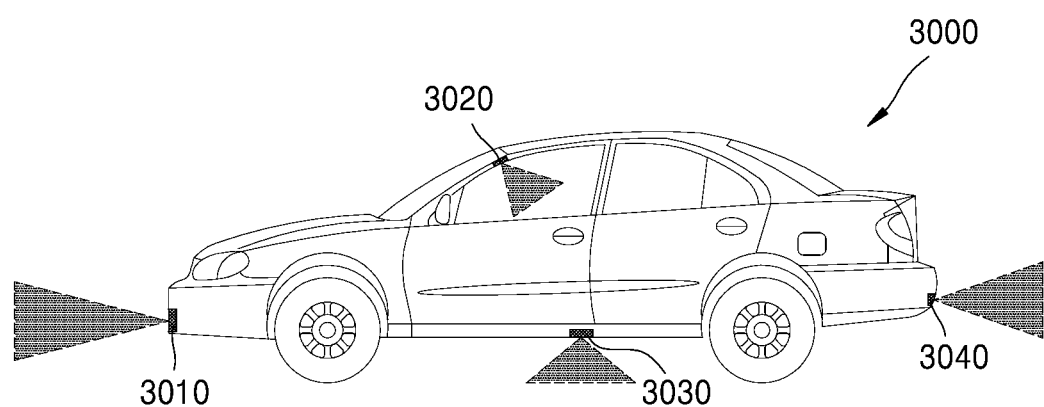

Furthermore, the image sensor may be applied to a vehicle 3000 as illustrated in FIG. 20. The vehicle 3000 may include a plurality of vehicle cameras 3010, 3020, 3030, and 3040 arranged at various positions. Each of the vehicle cameras 3010, 3020, 3030, and 3040 may include an image sensor according to an example embodiment. The vehicle 3000 may provide a driver with various pieces of information about the inside or periphery of the vehicle 3000, by using the vehicle cameras 3010, 3020, 3030, and 3040, and thus, an object or a person in an image may be automatically recognized and information needed for autonomous driving is provided.

A long-wave infrared sensor according to an example embodiment may include a lower electrode and an upper electrode which are arranged apart from each other, and a plurality of magnetic tunnel junction devices arranged regularly between the lower electrode and the upper electrode and electrically connected to each other in parallel, wherein the plurality of magnetic tunnel junction devices are arranged apart from each other with an empty space therebetween. Due to the empty space between the magnetic tunnel junction devices, the thermal capacity may be lowered, which leads to increased sensitivity of the sensor.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. A pixel for a long-wave infrared sensor, the pixel comprising:
   a lower electrode;
   an upper electrode spaced apart from the lower electrode; and
   a plurality of magnetic tunnel junction devices provided between the lower electrode and the upper electrode, and electrically connected to each other in parallel,
   wherein a resistance of each of the plurality of magnetic tunnel junction devices changes according to temperature, and
   wherein the plurality of magnetic tunnel junction devices are spaced apart from each other with an empty space between adjacent magnetic tunnel junction devices of the plurality of magnetic tunnel junction devices.

2. The pixel of claim 1, wherein each of the plurality of magnetic tunnel junction devices comprises:
   a first magnetic layer provided on an upper surface of the lower electrode;
   a second magnetic layer provided on a lower surface of the upper electrode; and
   an insulating layer provided between the first magnetic layer and the second magnetic layer.

3. The pixel of claim 1, further comprising a protective layer around a lateral surface of each of the plurality of magnetic tunnel junction devices.

4. The pixel of claim 3, wherein the protective layer comprises at least one of a silicon oxide, an aluminum oxide, a hafnium oxide, and a silicon nitride.

5. The pixel of claim 3, wherein a thickness of the protective layer is greater than about 0 nm and less than or equal to about 100 nm.

6. The pixel of claim 2, wherein the second magnetic layer has a variable magnetization direction, and
wherein the first magnetic layer has a fixed magnetization direction.

7. The pixel of claim 1, wherein the upper electrode and the lower electrode comprises at least one of a titanium nitride film (TiN), platinum (Pt), palladium (Pd), tungsten (W), titanium (Ti), aluminum (Al), nickel (Ni), a nickel-chrome (NiCr) alloy, copper (Cu), and gold (Au).

8. The pixel of claim 1, wherein the plurality of magnetic tunnel junction devices are arranged in a matrix of M×N, and each of M and N is a natural number greater than or equal to 1.

9. The pixel of claim 1, wherein the plurality of magnetic tunnel junction devices are provided between the lower electrode and the upper electrode in a first direction, and
wherein the plurality of magnetic tunnel junction devices are arranged adjacent to each other in a second direction perpendicularly to the first direction.

10. A long-wave infrared sensor comprising:
a pixel array comprising a plurality of pixels arranged in a two-dimensional (2D) manner;
an optical absorber layer provided on the pixel array and configured to absorb external light to generate heat; and
a drive circuit configured to drive the pixel array,
wherein each of the plurality of pixels comprises:
a lower electrode;
an upper electrode spaced apart from the lower electrode; and
a plurality of magnetic tunnel junction devices provided between the lower electrode and the upper electrode,
wherein the plurality of magnetic tunnel junction devices are electrically connected to each other in parallel,
wherein a resistance of each of the plurality of magnetic tunnel junction devices changes according to temperature, and
wherein the plurality of magnetic tunnel junction devices are spaced apart from each other with an empty space between adjacent magnetic tunnel junction devices of the plurality of magnetic tunnel junction devices.

11. The long-wave infrared sensor of claim 10, wherein the plurality of pixels are electrically connected to each other in series.

12. The long-wave infrared sensor of claim 10, further comprising a substrate having a through hole formed therein,
wherein the plurality of pixels are arranged on the substrate.

13. The long-wave infrared sensor of claim 10, wherein the optical absorber layer comprises at least one of a silicon nitride layer and a titanium nitride layer.

14. The long-wave infrared sensor of claim 10, wherein the optical absorber layer is configured to absorb long-wave infrared light to generate heat.

15. The long-wave infrared sensor of claim 10, wherein each of the plurality of magnetic tunnel junction devices comprises:
a first magnetic layer provided on an upper surface of the lower electrode;
a second magnetic layer provided on a lower surface of the upper electrode; and
an insulating layer provided between the first magnetic layer and the second magnetic layer.

16. The long-wave infrared sensor of claim 10, further comprising a protective layer around a lateral surface of each of the plurality of magnetic tunnel junction devices.

17. The long-wave infrared sensor of claim 16, wherein the protective layer comprises at least one of a silicon oxide, an aluminum oxide, a hafnium oxide, and a silicon nitride.

18. The long-wave infrared sensor of claim 16, wherein a thickness of the protective layer is greater than about 0 nm and less than or equal to about 100 nm.

19. The long-wave infrared sensor of claim 15, wherein the second magnetic layer has a variable magnetization direction, and
wherein the first magnetic layer has a fixed magnetization direction.

20. The long-wave infrared sensor of claim 10, wherein the plurality of magnetic tunnel junction devices are arranged in a matrix of M×N, and each of M and N is a natural number greater than or equal to 1.

21. An electronic device comprising:
a long-wave infrared sensor; and
a processor configured to receive and process sensing signals output from the long-wave infrared sensor,
wherein the long-wave infrared sensor comprises:
a pixel array comprising a plurality of pixels arranged in a two-dimensional (2D) manner;
an optical absorber layer provided on the pixel array and configured to absorb external light to generate heat; and
a drive circuit configured to drive the pixel array,
wherein each of the plurality of pixels comprises:
a lower electrode;
an upper electrode spaced apart from the lower electrode; and
a plurality of magnetic tunnel junction devices provided between the lower electrode and the upper electrode, and electrically connected to each other in parallel,
wherein a resistance of each of the plurality of magnetic tunnel junction devices changes according to temperature, and
wherein the plurality of magnetic tunnel junction devices are spaced apart from each other with an empty space between adjacent magnetic tunnel junction devices of the plurality of magnetic tunnel junction devices.

* * * * *